United States Patent Office 2,875,834
Patented Mar. 3, 1959

2,875,834

ZINC DITHIOCARBAMATE MOLLUSCACIDE

Roland S. Shumard, Brentwood, Mo., assignor to Monsanto Chemical Company, St. Louis, Mo., a corporation of Delaware No Drawing. Application December 29, 1951
Serial No. 264,255

6 Claims. (Cl. 167—22)

This invention relates to the control of mollusks with certain zinc dithiocarbamates, and more particularly this invention relates to the use of these chemicals as molluscacides to control or eliminate snails. The particular zinc dithiocarbamates of this invention are represented by the following formula

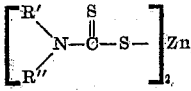

wherein Zn represents the salt forming metal zinc, R" is selected from the group of radicals consisting of alkyl radicals containing 1 to 4 carbon atoms, and R' is selected from the group of radicals consisting of alkyl radicals containing 1 to 4 carbon atoms and tetrahydrofurfuryl.

The discovery of effective molluscacides is of extreme importance to mankind due to the fact that the elimination of certain snails, which are a class of animal life, Gastropoda, within the phylum Mollusca, seems to be a sound approach to the prevention of schistosomiasis, which is reputedly the world's number three health problem. Schistosomiasis is caused by trematode of the genus Schistosoma, a kind of a flat leaf-shaped worm called a fluke, which must depend upon certain snails for a part of its life cycle and another part of its life cycle must be spent within the body of a warm-blooded animal, including human beings, where it attacks the internal organs.

Thus, these snails are a necessary intermediate host or vector for the fluke which causes schistosomiasis. The life cycle of the fluke can therefore be broken and the spread of the schistosomiasis stopped by the elimination of the snails which act as the necessary intermediate host or vector for the fluke. The elimination of the snails which make the life cycle of this fluke possible is of particular importance due to the fact that there are no known therapeutic curatives or prophylactics for use against schistosomiasis, nor are there any established sanitary control methods against the causative fluke.

There are both aquatic and amphibious snails which are vectors for the fluke causing schistosomiasis. Human beings who must bathe, drink, wade or do laundry in the waters which are the habitats of such aquatic or amphibious snails are thereby exposed to the flukes which cause schistosomiasis. On the other hand, human beings who encounter the land areas or vegetation which are within the habitats of the amphibious snail vector are also likely to contract schistosomiasis.

In combating the aquatic type of snail it is necessary to apply the molluscacide directly to the waters which form the habitats for such snails. In combating the amphibious type of snail, the molluscacide may be applied either directly to the water habitats of such snails or to the vegetation or along the banks of pools, lakes, streams, rivers, irrigation canals or other land areas adjacent to bodies of water which form the water habitats of such snails so that when the amphibious snails will come into contact with a zinc dithiocarbamate of this invention when the snails leave the water to travel across the ground areas.

Where the mollusks sought to be controlled have water habitats, a described zinc dithiocarbamate alone or in combination with a wetting agent or a dust formulation containing a described zinc dithiocarbamate may be cast on the surface of the water. On the other hand, mollusks which also inhabit the ground areas adjacent to such water habitats may also be controlled by scattering a described zinc dithiocarbamate alone or in a dust formulation on the vegetation or ground adjacent to such water habitats.

Where mollusks are to be combatted by applying a toxic agent to their aquatic habitats, the toxic agent must exhibit molluscacidal activity at relatively high dilutions. Successful molluscacides for combatting such snails have been used which produce a 50% kill of mollusks (of the class Gastropoda) in a dilution of one part of the molluscacide in 8,000 parts of water (i. e., 125 parts per million).

It has now been discovered that the described zinc dithiocarbamates, where one of the nitrogen substitutes is the methyl radical, the ethyl radical, a propyl radical or a butyl radical, and the other nitrogen substituent is the methyl radical, the ethyl radical, a propyl radical, a butyl radical or a tetrahydrofurfuryl radical, have outstanding molluscacidal activities as shown by the fact that when healthy aquatic snails (a species within the class Gastropoda) were placed in water containing 10 p. p. m. of dimethyldithiocarbamate for 24 hours, and thereafter placed in fresh clean water, a 100% kill of the snails was obtained and none of the test snails recovered after the 24 hour exposure to water containing 10 p. p. m. of dimethyldithiocarbamate. In a like manner, zinc diethyldithiocarbamate and zinc methyl tetrahydrofurfuryl dithiocarbamate produced a 100% kill at a dilution of 10 p. p. m. Zinc dibutyl dithiocarbamate and zinc butyl tetrahydrofurfuryl dithiocarbamate can also be used as effective molluscacides for the control of either the aquatic snail or amphibious snail species of the class Gastropoda.

The specificity of the zinc dithiocarbamates of this invention is illustrated by the fact that water containing 10 p. p. m. of copper dimethyldithiocarbamate, sodium dimethyldithiocarbamate or zinc cyclohexyl tetrahydrofurfuryl dithiocarbamate, under similar conditions as described above in connection with zinc dimethyldithiocarbamate, exhibited practically no molluscacidal activity.

The zinc dithiocarbamates of this invention are generally commercially available in the form of very fine powders, which powders are often difficult to wet, and therefore, when this form of these zinc dithiocarbamates is scattered on the surface of the water containing the snails, these zinc dithiocarbamates tend to remain on the surface for a long period of time. Much better results can be obtained if these zinc dithiocarbamates are dispersed throughout the water rather than being permitted to lie on the surface. While many surface active agents may be admixed with the zinc dithiocarbamates to aid in the dispersion of these chemicals through the water, there are two classes of surface active agents which are particularly suitable for dispersing the zinc dithiocarbamates of this invention in water. One of these classes is the alkyl benzene sulfonate salts such as dodecyl benzene sodium sulfonate, and another class is the sulfosuccinate salts such as dioctyl sodium sulfosuccinate. When the zinc dithiocarbamates are mixed with 2 to 5 percent by weight of one of these sulfonate types of surface active agents, and this mixture cast upon the surface of the water, the zinc dithiocarbamate will be dispersed through the water making these chemicals particularly effective in the control of both aquatic and amphibious Gastropoda in their aquatic habitats.

Inert diluent dust carriers for the formulation of the molluscacidal dusts of this invention may be fuller's earth, diatomaceous earth, bentonite, talc, pyrophyllite or various natural clays such as Homer's clay, china clay or Cherokee clay; botanical carriers such as soybean flour, wood flour, or walnut shell flour may also be used. Better results are obtained with such dust formulations where the particle size of the dust formulation containing the zinc dithiocarbamate has been reduced to 5 microns or below. Effective dust molluscacidal formulations for dusting water surfaces, vegetation or ground areas may be prepared comprising one of the herein described zinc dithiocarbamates as the essential active ingredient and using various of the described inert dust carriers and also any one of the large number of well known surface active agents, particularly the sulfonate salt types as have been described.

For example, effective molluscacidal dust formulations may be prepared containing 15 to 75 parts by weight of zinc dimethyldithiocarbamate and 85 to 25 parts of one of the described inert dust carriers. Effective mollusk control can be obtained using a dust formulation containing 50 parts by weight of zinc dimethyldithiocarbamate and 50 parts of an inert dust carrier and applying the formulation at the rate of the order of 50 pounds per acre of area. "Wettable" dust formulations may be prepared using 15 to 50 parts by weight of zinc dimethyldithiocarbamate, 48 to 85 parts of one of the described inert dust carriers and 2 to 5 parts of an organic sulfonate salt wetting agent such as dodecyl benzene sodium sulfonate or dioctyl sodium sulfosuccinate. Other effective molluscacidal formulations can be prepared by substituting one of the other zinc dithiocarbamates of this invention for the zinc dimethyldithiocarbamate in these suggested formulations. The actual concentration of a zinc dithiocarbamate of this invention for any specific application will be determined upon whether the chemical is to be applied directly to the water which forms a habitat for the snails or to land areas which are crossed by amphibious snails, either as the chemical alone or in a formulation. Those skilled in the art of combatting mollusks will readily establish the proper concentration for any particular application, knowing the effectiveness of these zinc dithiocarbamates as molluscacides, as herein set out.

What is claimed is:

1. The method for controlling Gastropoda comprising contacting Gastropoda with a zinc dithiocarbamate having the formula

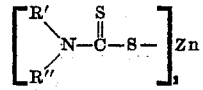

wherein Zn represents the salt forming metal zinc, R" is selected from the group of radicals consisting of alkyl radicals containing 1 to 4 carbon atoms, and R' is selected from the group of radicals consisting of alkyl radicals containing 1 to 4 carbon atoms and a tetrahydrofurfuryl radical.

2. The method for combatting Gastropoda which comprises contacting the Gastropoda with zinc dimethyldithiocarbamate.

3. The method for combatting Gastropoda which comprises contacting the Gastropoda with zinc diethyldithiocarbamate.

4. The method for combatting Gastropoda which comprises contacting the Gastropoda with zinc dibutyldithiocarbamate.

5. The method for combatting Gastropoda which comprises contacting the Gastropoda with zinc methyl tetrahydrofurfuryl dithiocarbamate.

6. The method for combatting Gastropoda which comprises contacting the Gastropoda with zinc butyl tetrahydrofurfuryl dithiocarbamate.

References Cited in the file of this patent

UNITED STATES PATENTS

| 1,972,961 | Tisdale et al. | Sept. 11, 1934 |
| 2,588,428 | Stewart et al. | Mar. 11, 1952 |

FOREIGN PATENTS

| 954,763 | France | June 13, 1949 |

OTHER REFERENCES

McMullen: J. of Parasit., vol. 34, sec. 2 (suppl.), December 1948, p. 33.

Am. J. of Tropical Med. and Hygiene, July 1952, pp. 671–679.

Weinman et al.: J. of Econ. Ent., vol. 40, pp. 70–78.

Berry et al.: Public Health Rpt., vol. 65, pp. 939–949, July 1950.